Patented Nov. 2, 1926.

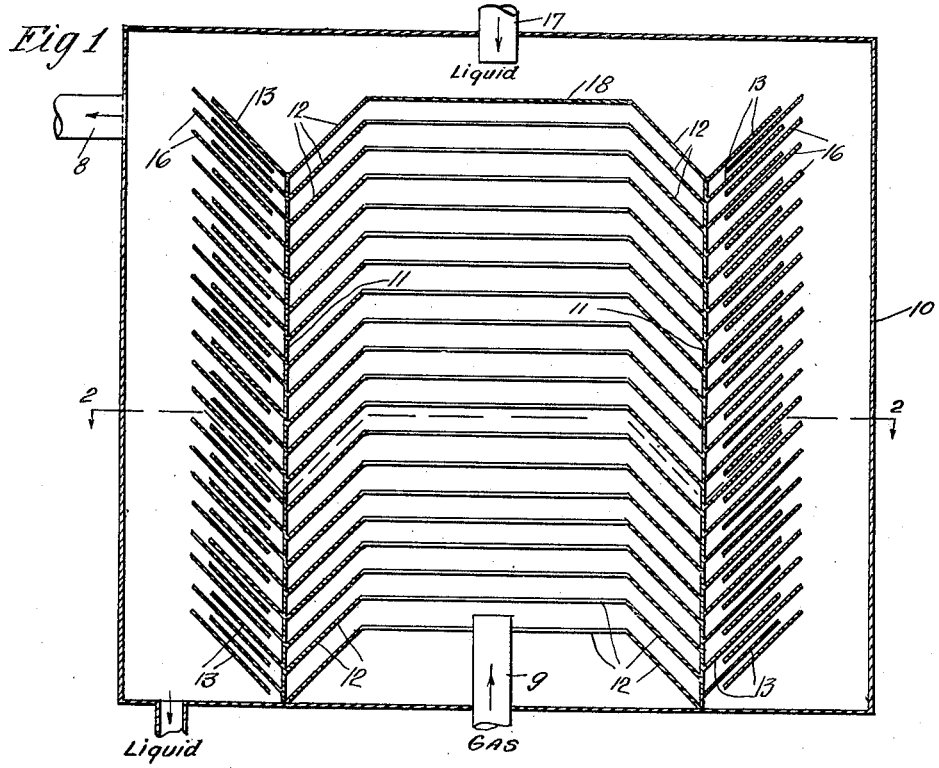
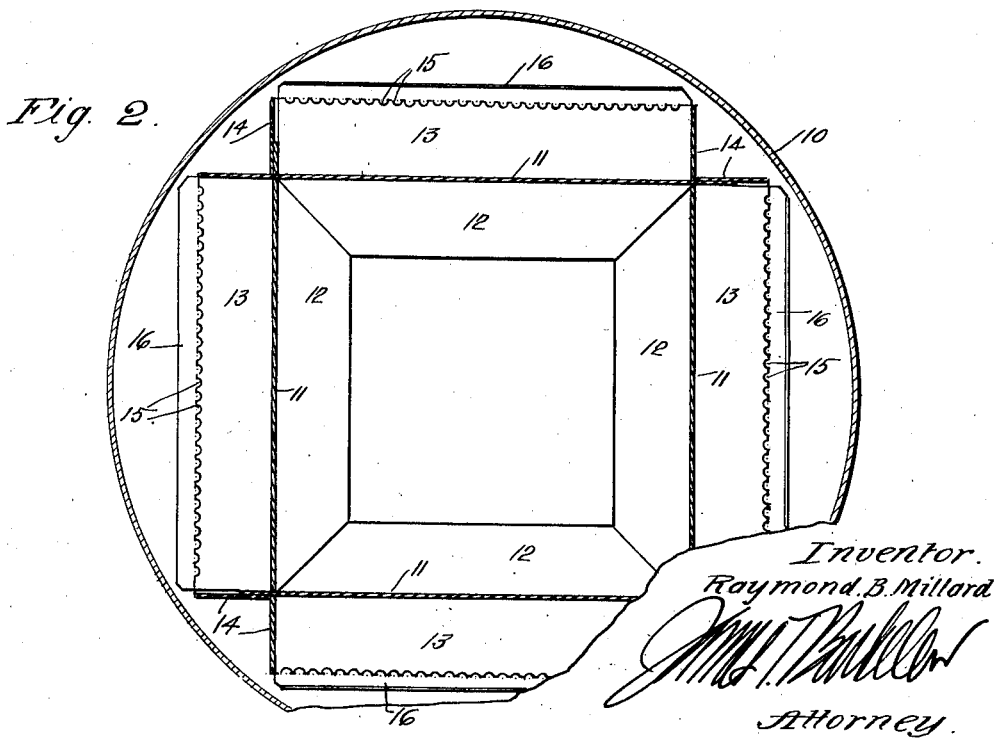

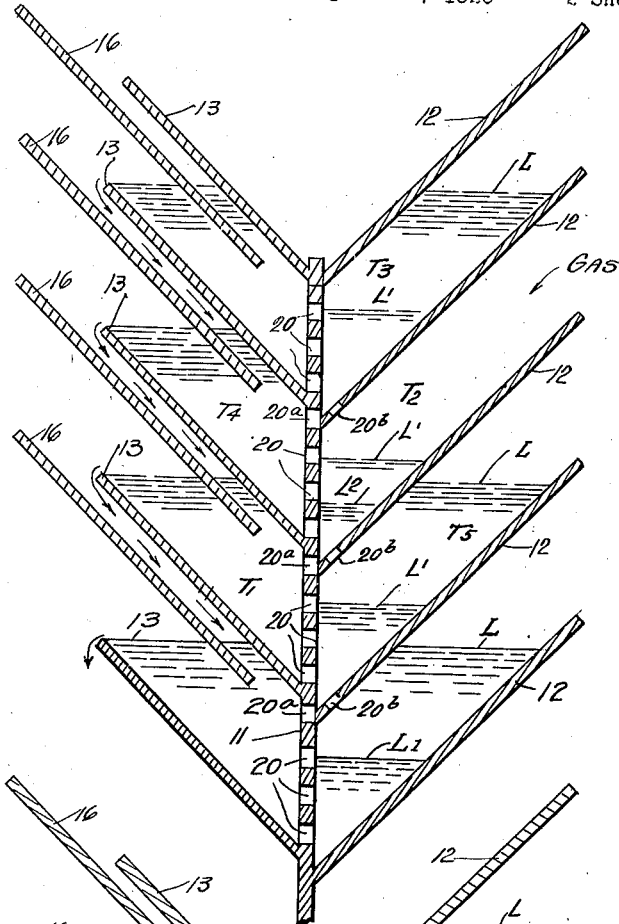
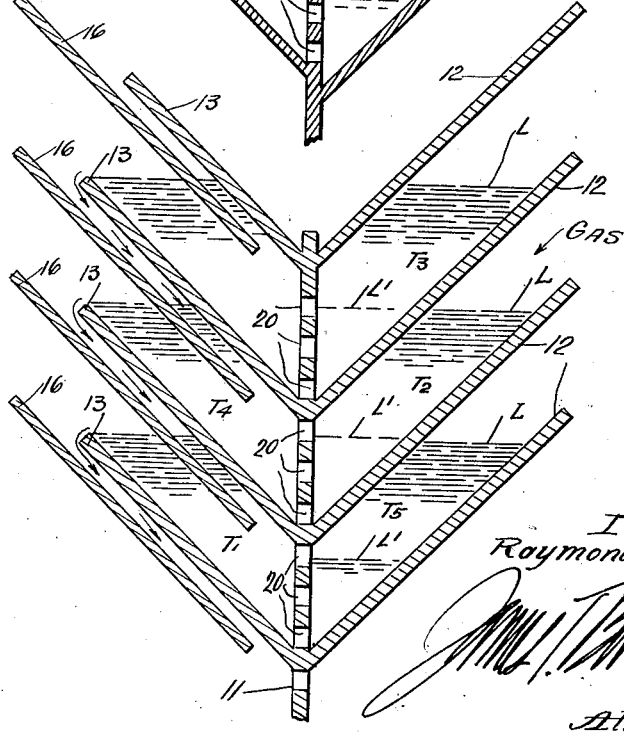

1,605,265

UNITED STATES PATENT OFFICE.

RAYMOND B. MILLARD, OF LOS ANGELES, CALIFORNIA, ASSIGNOR, BY DIRECT AND MESNE ASSIGNMENTS, TO SOUTHWESTERN ENGINEERING CORPORATION, OF LOS ANGELES, CALIFORNIA, A CORPORATION OF CALIFORNIA.

BUBBLE TOWER.

Application filed August 18, 1925. Serial No. 51,072.

The subject matter of this invention comprises apparatus usually known as bubble towers, in which gas or vapor is brought into intimate and finely divided contact with a liquid by distributing the gas and bubbling it through such liquid. Apparatus of this kind are used to some extent in operations upon petroleum oils. Sometimes such operations are for the purpose of reflux actions which require an intimate commingling of vapors and liquids. In other cases, such apparatus may be used as absorption towers. But for whatever purpose they are used, it is a primary object of all bubble tower structures to bring the gases and liquids into finely distributed intimate contact with each other. And it is a general object of this invention to provide an improved form of bubble tower of simple construction, low cost and high efficiency.

It is also an object of the invention to provide bubble tower structure in which automatic equalization between the several bubbling elements may be incorporated in the structure of bubbling elements themselves. In bubble towers of well known types, where the gas is made to depress a liquid level and pass under an edge or through a submerged opening, it has been found very difficult to equalize the action of several such elements through which the gas passes in parallel relationship. A co-pending application, filed by me on even date herewith, entitled Equalizing system for bubble towers, and bearing Serial Number 51,071 deals with such equalizing system and arrangements as applied both to bubble towers of known types and to the bubble structure herein set forth. As between these two applications, therefore, said co-pending application is directed broadly to the subject matter of equalization, whereas this present application is directed to my new bubble tower itself, and also to the specific aspects of equalization arrangement as contained in certain forms of this bubble tower.

Although the invention, as will be readily understood, is capable of taking many different forms, I shall herein explain certain typical specific forms that are illustrative of the invention as a whole, and for that purpose I refer to the accompanying drawings, in which:

Fig. 1 is a vertical central section showing a simple form of bubble tower in accordance with my invention;

Fig. 2 is a horizontal section on line 2—2 of Fig. 1;

Fig. 3 is a detailed enlargement of certain operations of Fig. 1, and

Fig. 4 is a view similar to Fig. 3, but showing a somewhat modified form.

One of the advantages of my new form of structure is that it lends itself readily to an arrangement about an enclosed space which space may be of any suitable size and shape in plan; and also it lends itself very readily to being built up by duplication to any desired height. Such arrangement about an enclosed space is not an essential feature of the invention when considered in some of its broader aspects; the invention in certain essential features being contained in the structure of what may be termed the bubbling elements themselves, regardless of their arrangement about an enclosed space. However, for the purpose of giving a clear and full understanding of what I now regard as one of the most effective arrangements, I shall begin by explaining in general the structure and arrangement of the illustrated bubble tower as a whole, and then explain in detail the structure and operation of the bubbling elements themselves.

For instance the bubble tower may be constructed so that the bubbling elements form in effect the four walls of an enclosed space, which is square in plan. In such a case there will be some suitable exterior casing 10, which may be of any suitable shape, its only function being to enclose a space exterior of the bubbling elements. Where the bubble tower structure is incorporated with other apparatus, as is quite often the case in oil treatment plants, this casing may be a part of a shell that encloses other apparatus; but its esential, so far as the action of the bubble tower is concerned, is merely that it enclose a space around bubbling elements. Within this casing there will be in this typical form of device four vertical walls 11, that are preferably made of perforated metal (see the details of Figs. 3 and 4), and that enclose an inside gas receiving space. On these walls, and extending completely around them on their inside faces are sloping trough plates 12, arranged much as is shown in Figs. 1 and 2, and forming with the vertical plates 11 superimposed liquid receiving troughs. Similarly placed trough plates 13 are also placed on the exterior faces of vertical walls 11; but inside of these exterior trough plates forming troughs that extend continuously all the way around the square structure formed by the walls 11 the ends of the troughs whose bottoms are formed by exterior plates 13 may be closed by vertical plates 14 as shown particularly in Fig. 2. The upper edges of exterior trough plates 13 may be notched or serrated as shown at 15 in Fig. 2, so that the liquid that overflows their upper edges will flow through said notches and thus drop through the surrounding gas not in a liquid sheet but in more or less finely divided streams. Below each outer trough plate 13 there is an inclined apron 16 which catches the overflow from the edges of one trough plate and directs it diagonally inwardly so that the overflow must drop into the next lower trough. Liquid is fed to the apparatus through a pipe such as is illustrated at 17 in Fig. 1 and the liquid may fall first on the upper head plate 18 that forms a closure for the interior gas space. The lower closure or floor of the interior gas space is formed, as illustrated, by the bottom of casing 10. The liquid delivered upon head plate 18 flows into the uppermost trough formed by the uppermost trough plates 12 and 13 and first fills that trough completely and then overflows the edges of this plate 13 to flow down into the trough formed by the next plates 12 and 13, and fill that trough; and so on to the bottom of the device. Before any gas under pressure is introduced each of the troughs will be completely full of liquid, but when the gas pressure is introduced, as through pipe 9, to the interior chamber, that gas pressure depresses the liquid surface in each of the inner troughs formed by the inner plates 12, depressing those surfaces to such a point as to uncover the perforations of vertical plates 11, and then, passing through such perforations, bubbles up through the liquid bodies contained in the outer troughs and thus reaches the outer space enclosed by casing 10, from which it may then be withdrawn as through pipe 8. The capacity of any given tower constructed in accordance with my invention, of course, depends upon the capacity of each bubbling element and upon a number of superimposed bubbling elements. The structure has one advantage in that its capacity may be increased by merely increasing its height and further increasing the number of bubbling elements and increasing the total area of the apertures through which the gas passes outwardly; and the height of the device may be made such that the total area of such openings may be made equal to or even greater than the horizontal cross sectional area of the interior enclosed space. This is a distinct advantage over known types of bubble towers wherein the aggregate area of the gas passages through the bubbling elements cannot, owing to the very nature of the device, be made as large as the horizontal cross sectional area of the tower itself. It will thus be seen that my construction lends itself very readily to gaining large capacity in a tower of limited ground area.

Now, coming to the essentials of the bubbling elements themselves, I shall describe in detail preferred forms of structure arrangement and operation. Fig. 4 shows in enlarged detail the arrangement of several of the bubbling troughs and shows the opposite trough plates 12 and 13 set upon central plate 11 at points directly opposite each other; so that the bottom edges of each two opposite plates 12 and 13 are at a common level. The liquid which fills the trough formed by uppermost plates 12 and 13 overflows the edge of that plate 13, and deflected by apron 14 passes down into the trough formed by the next plates 12 and 12 and 13 overflows the edge of that plate 13, filling each trough as the liquid proceeds downwardly. The troughs being thus initially all filled, the flow of liquid through the device from top to bottom proceeds from overflow of liquid from one trough to the other, as will be well understood.

When gas under pressure is admitted to the space at the right hand side of plate 11 in Fig. 4 (the interior enclosed space of Fig. 1) the gas pressure presses the liquid level L down until all these liquid levels stand at such a point as shown by the dotted lines $L^1$, at a point below the uppermost of the perforations 20 with which vertical wall 11 is provided. It will be noted that in the specific arrangement shown in Fig. 4 the trough plates are so spaced apart that there are several perforations through wall 11 that form communicating passages or connections between the parts of each trough that lie on opposite sides of wall 11. These perforations are relatively small and provide for flow of the gas in comparatively small streams; and even though the gas pressure may be sufficient to depress the liquid level low enough to flow through several perforations, or through more than one horizontal row of perforations, the gas is still kept divided in small streams.

If there is a condition of equality as to pressures in the several troughs (and this, of course, depends upon the troughs being more or less accurately made of equal heights so as to get equal hydrostatic pressures) all the liquid levels at what may be termed the gas side of the device will be depressed to a level such as indicated at $L^1$, and the gas will pass through openings 20 to bubble up through the several bodies of liquid which still stand in the left hand side of the troughs in Fig. 4; the gas then passing out into the enclosed space at the left hand side in Fig. 4 (the exterior enclosed space of Fig. 1). The gas is thus very intimately distributed through the liquid and comes into intimate contact therewith, and all the time new liquid is being supplied, the liquid in each trough is slowly changing so that new gas is constantly being intimately intermingled with new liquid.

It will be seen from the above description that the bubbling elements of my structure are very simple and may be very easily and economically manufactured. The lower edges of plates 12 and 13 may, for instance, be welded to the plate that forms wall 11; this wall being formed of a metal plate punched with uniformly distributed holes 20. The capacity of a bubbling structure on a single vertical wall or plate 11 may be extended almost indefinitely by extending its horizontal length or its vertical height, or both; and by extending the height a bubbling structure of large capacity can be made to occupy a comparatively small ground area. A complete bubbling structure may, as will readily be seen, be made with but a single vertical wall or plate 11, and with enclosed gas receiving spaces at opposite sides of the wall. This is in essence what the form of Figs. 1 and 2 amounts to, each one of the four walls formed by the four plates 11 having enclosed spaces on opposite sides. However, as I have said, one of the features of my bubbling structure is the facility with which it lends itself to being arranged about an enclosed space so that all the walls of the enclosed gas receiving space are formed by bubbling structure.

The specific form shown in detail in Fig. 4 has been found to be capable of successful operation; but there is a practical difficulty attending that form. In order to make each one of the bubbling troughs take the passed gas equally—in order to distribute the gas evenly throughout the whole mass of liquid—it is necessary that the hydrostatic pressures in the left hand sides of the troughs (referring to the aspect of Fig. 4) shall be as nearly as possible equal. This means that the height of the upper overflow edge of plates 13 above the uppermost edge of the uppermost corresponding perforation 20 shall be the same for all troughs. Otherwise a trough in which the hydrostatic pressure is slightly less than others will pass gas first; and having once started the passage of gas, the flow of gas through that one trough will increase to the extent that the flow of gas is taken away from other troughs and concentrated in the one that has first started to pass gas, or the one that for any reason has perhaps momentarily passed more gas than the others. This condition is always liable to take effect where there are physical inequalities in the several troughs, and it is even somewhat liable to take effect by reason of liquid or gas pressure surges that may momentarily change the opposed pressures upon one of the troughs and start an increased flow of gas therethrough. These difficulties may be overcome by accurate setting of the various bubbling troughs and by feeding the gas to the troughs in such manner that the gas pressure on all the troughs is as nearly equal as may be. But by very simple arrangement of the trough plates in this form of bubbling apparatus all these difficulties are positively overcome even to the extent of making it unnecessary to set the trough plates with any great degree of accuracy.

Referring now more particularly to Fig. 3, I show there a setting of the trough plates with a view to providing an automatic equalizing action between the various troughs. To do this, the plates 12 at what I term the gas side may be simply lowered so as to expose at least a part of an opening, as indicated at $20^a$, this opening then forming a direct communication between a liquid space $T^1$ and a space $T^2$. This arrangement is the same for all the troughs. Assuming that in trough space $T^2$ the liquid level has been pressed down to $L^2$ and that gas is passing through openings 20 in large quantity and at high velocity; the hydrostatic pressure under level $L^2$ is somewhat lowered, due to the lowering of the gas pressure that is attendant upon a flow at relatively high velocity. This flow in large quantity and at high velocity has, to a certain extent, at least, removed the gas pressure from the other liquid levels L of the other troughs and leaves these liquid levels either at L or somewhere between $L^1$ and L. The liquid pressure in space $T^1$ is normal—being that liquid pressure which is caused by the height of liquid up to the overflow level; while, as I have said, the liquid pressure under level $L^2$ in space $T^2$ is somewhat lowered. Consequently the liquid flows from space $T^1$ through opening $20^a$ into space $T^2$, flowing into that space on what I call the gas side of plate or wall 11. The level $L^2$ is, therefore, immediately raised and when it is raised to the average proper bubbling level such as indicated at $L^1$, and the gas flow shut down, then the gas pressure on the other level L presses those levels down to levels $L^1$ and the gas proceeds to bubble uniformly through the liquid bodies of all the troughs. Although I have used what may be an exaggerated instance of changes of levels, it will be seen that the same equalizing action takes place whenever the gas depressed level in any one trough goes lower than the others; the effect of that lowered level being to reduce the gas pressure at that point and thereby allow flow of liquid into the body of liquid under that abnormally depressed level.

At the same time as one of the holes 20ª passes liquid from such space as T¹ into space T², another opening 20ª may pass liquid from space T³ downwardly into space T⁴, through which space the excess gas is bubbling. Passage of liquid into space T⁴, however, is usually of no avail, as the liquid in that space, especially in the case of excessive gas flow and velocity, is more or less blown out; and any liquid introduced into the high velocity stream of gas will be blown out and will not have opportunity to fall to the bottom of space T⁴ and then pass through the lowermost opening 20 into the body of liquid under level L². However, by providing openings at 20ᵇ in the lower edges of plates 12, liquid may flow directly from such a space as T³ into such a space as T² where the level is inordinately lowered, to raise that level, while at the same time another opening 20ᵇ may pass liquid directly from such a space as T⁵ upwardly into the body of liquid below level L² to raise that level. Openings 20ᵇ may be used either in conjunction with openings 20ª or openings 20ᵇ may be used as a sole means of equalization.

It will be understood that holes 20ª and 20ᵇ are either small enough or few enough in number that only a small fraction of the total liquid flow can pass down through those openings, the larger amount of flow taking place over the edges of plates 13. Or, putting the matter another way; with holes 20ª or 20ᵇ of given size and number, the liquid flow through the apparatus is large enough that the major portion of the liquid passes over the edges of plates 13. Of course, for the lowermost plates 12 and 13 there need be no holes 20ª or 20ᵇ, although their presence, and passing a small amount of liquid down from the lowermost troughs, will not make the device inoperative.

I claim:

1. A bubble tower embodying a plurality of bubbling elements arranged one above the other, each element including a liquid containing trough and a submerged gas passage aperture, the several elements being formed to enclose a central gas receiving space, and a casing surrounding the several elements enclosing another gas receiving space.

2. A bubble tower embodying a perforated wall defining an enclosed space, bubbling elements embodying liquid containing troughs located around and both inside and outside said wall, a casing around the outside troughs enclosing another space, means to introduce liquid to the troughs and means to introduce gas to one enclosed space and take gas off from the other.

3. A bubble tower embodying a perforated wall forming the sides of an enclosed gas receiving space, top and bottom closures for said space, superimposed trough plates extending around the inside face of said wall, superimposed trough plates extending around the outside face of said wall, and a casing defining an enclosed gas receiving space around the outer trough plates.

4. A bubble tower embodying a perforated wall forming the sides of an enclosed gas receiving space, top and bottom closures for said space, superimposed sloping trough plates extending around the inside face of said wall, superimposed sloping trough plates extending around the outside face of said wall, and a casing defining an enclosed gas receiving space around the outer trough plates.

5. A bubble tower embodying a perforated wall forming the sides of an enclosed gas receiving space, top and bottom closures for said space, superimposed trough plates extending around the inside face of said wall, superimposed trough plates extending around the outside face of said wall, means to introduce gas to the enclosed space, means to deliver liquid to the uppermost trough, and catch aprons below the outer edge of each outer trough plate to deliver overflow to the trough plate next below.

6. A bubbling structure involving a vertical plate with spaced perforations, trough plates on both the opposite sides of the vertical plate, said trough plates being so placed that at least one perforation forms an intercommunication between a trough at one side of the vertical plate and an opposite trough, means to introduce liquid to the troughs, and means to apply gas under pressure to the troughs at one side of the vertical plate.

7. A bubbling structure involving a vertical plate with spaced perforations, superimposed trough plates on both the opposite sides of the vertical plate, said trough plate being so placed that at least one perforation forms an intercommunication between a trough at one side of the vertical plate and an opposite trough, means to introduce liquid to an uppermost trough, means to direct liquid overflow from the edge of each trough to a trough below, and means to apply gas under pressure to the troughs at one side of the plate.

8. A bubbling structure involving a vertical plate with spaced perforations, superimposed trough plates on both sides of the vertical plate, said trough plates being so placed that at least one perforation forms an intercommunication between a trough space at one side of the vertical plate and a trough space at the opposite side of said plate, means to introduce liquid to the troughs, means to apply gas pressure to the troughs at one side of the vertical plate, and liquid intercommunication means between adjacent troughs on the same side of the vertical plate.

9. A bubbling structure involving a vertical plate with spaced perforations, superimposed trough plates on both sides of the vertical plate, said trough plates being so placed that at least one perforation forms an intercommunication between a trough space at one side of the vertical plate and a trough space at the opposite side of said plate, means to introduce liquid to the troughs, means to apply gas pressure to the troughs at one side of the vertical plate, and liquid intercommunication means between adjacent troughs on that side of the plate at which gas pressure is introduced.

10. A bubbling structure involving a vertical plate with evenly spaced perforations, superimposed inclined trough plates on both sides of the perforated vertical plate, said trough plates being so placed that some of the perforations form intercommunication between a trough space at one side of the vertical plate and a corresponding trough space at the opposite side of said plate, means to introduce liquid to the trough, means to apply gas under pressure to the troughs at one side of the vertical plate, and the trough plates at the gas pressure side of the perforated plate being lowered somewhat below the corresponding trough plates at the opposite side of that plate so that a perforation that leads from a next lower trough space at said opposite side of the perforated plate communicates with a trough space next uppermost on the gas pressure side of the perforated plate.

In witness that I claim the foregoing I have hereunto subscribed my name.

RAYMOND B. MILLARD.